United States Patent
Vasconcelos et al.

(10) Patent No.: US 12,086,817 B2
(45) Date of Patent: Sep. 10, 2024

(54) PERSONALIZED ALERT GENERATION BASED ON INFORMATION DISSEMINATION

(71) Applicant: International Business Machines Corporation, Armonk, NY (US)

(72) Inventors: Marisa Affonso Vasconcelos, Sao Paulo (BR); Mu Qiao, Belmont, CA (US); Nicholas Linck, San Jose, CA (US); Yuya Jeremy Ong, San Jose, CA (US); Claudio Santos Pinhanez, Sao Paulo (BR); Rogerio Abreu de Paula, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 17/218,297

(22) Filed: Mar. 31, 2021

(65) Prior Publication Data
US 2022/0318823 A1 Oct. 6, 2022

(51) Int. Cl.
*G06Q 30/0201* (2023.01)
*G06Q 50/00* (2024.01)

(52) U.S. Cl.
CPC ........ *G06Q 30/0201* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,229,795 B1 | 7/2012 | Myslinski | |
| 8,955,058 B2 | 2/2015 | Castro | |
| 8,965,828 B2 | 2/2015 | Greenzeiger | |
| 9,092,521 B2 | 7/2015 | Myslinski | |
| 9,251,468 B2 | 2/2016 | Zhou | |
| 9,300,676 B2 | 3/2016 | Madhu | |
| 9,398,071 B1 * | 7/2016 | Burciu | H04L 43/00 |
| 9,684,871 B2 | 6/2017 | Myslinski | |

(Continued)

FOREIGN PATENT DOCUMENTS

| | | |
|---|---|---|
| CN | 111581510 A | 8/2020 |
| CN | 112565814 A | 3/2021 |

(Continued)

OTHER PUBLICATIONS

Gumelar et al. "Engagement and the Spread of Fake News." Advances in Social Science, Education and Humanities Research, vol. 165, 2018. (Year: 2018).*

(Continued)

*Primary Examiner* — Susanna M. Diaz
(74) *Attorney, Agent, or Firm* — Heather Johnston

(57) ABSTRACT

A system may include a memory and a processor in communication with the memory. The processor may be configured to perform operations that include analyzing interactions by a user within a network and generating a user profile for the user. The operations by the processor may further include identifying an attempt by the user to share a post via the network and prompting the user with a personalized alert to evaluate the post, wherein the personalized alert is generated based on the interactions, the user profile, and the properties of the post.

20 Claims, 7 Drawing Sheets

(56) References Cited

U.S. PATENT DOCUMENTS

| | | | |
|---|---|---|---|
| 10,706,092 B1* | 7/2020 | Morriss | G06F 16/9538 |
| 10,866,719 B1* | 12/2020 | Bulusu | H04L 51/52 |
| 11,243,658 B1* | 2/2022 | Yin | G06F 9/453 |
| 2012/0136866 A1 | 5/2012 | Carter | |
| 2014/0188461 A1* | 7/2014 | Myslinski | G06Q 10/10 704/9 |
| 2015/0293897 A1 | 10/2015 | Myslinski | |
| 2016/0156654 A1* | 6/2016 | Chasin | H04L 63/145 726/23 |
| 2016/0164888 A1* | 6/2016 | Chang | H04L 63/1408 726/22 |
| 2017/0177673 A1 | 6/2017 | Bolshinsky | |
| 2018/0150739 A1* | 5/2018 | Wu | G06N 20/10 |
| 2019/0205839 A1* | 7/2019 | Dotan-Cohen | H04L 67/535 |
| 2019/0377828 A1* | 12/2019 | Bastide | G06Q 50/01 |
| 2020/0097837 A1* | 3/2020 | Naqvi | G06N 5/02 |
| 2020/0134095 A1* | 4/2020 | Weldemariam | G06F 16/35 |
| 2020/0219149 A1 | 7/2020 | Stubbs | |
| 2020/0364068 A1* | 11/2020 | Vega | G06F 16/2457 |
| 2021/0019339 A1 | 1/2021 | Ghulati | |
| 2021/0049441 A1* | 2/2021 | Bronstein | G06N 3/0445 |
| 2021/0089579 A1* | 3/2021 | Shu | G06F 16/9035 |
| 2021/0103626 A1* | 4/2021 | Jolly | G06F 16/345 |
| 2021/0334908 A1* | 10/2021 | Shu | G06Q 30/0201 |
| 2021/0342704 A1* | 11/2021 | Pavlov | G06N 5/02 |

FOREIGN PATENT DOCUMENTS

| | | | |
|---|---|---|---|
| EP | 2937824 A1 | 10/2015 | |
| WO | 2020061578 A1 | 3/2020 | |
| WO | 2021223567 A1 | 11/2021 | |
| WO | WO-2021262180 A1 * | 12/2021 | G06N 5/02 |

OTHER PUBLICATIONS

R. M. Eisa, M. Labib and A. ElMougy, "SOS: Save Our Social Network Accounts," 2019 IEEE 17th World Symposium on Applied Machine Intelligence and Informatics (SAMI), Herlany, Slovakia, 2019, pp. 43-48, doi: 10.1109/SAMI.2019.8782731. (Year: 2019).*

Ground News—News Source Comparison (archive.org) retrieved from [URL: https://web.archive.org/web/20200605131754/https://ground.news/about], archived on Jun. 5, 2020. (Year: 2000).*

International Search Report and Written Opinion, International Application No. PCT/CN2022/083697, International Filing Date Mar. 29, 2022.

Anonymous. "A Fake News Filter (Claim Assessment Tool)." Published Dec. 19, 2019. 3 pages. Published by IP.com. https://priorart.ip.com/IPCOM/000260777.

Anonymous. "Fake News Self Check Decision Tree." Printed Mar. 4, 2021. 1 page. Published by Interaction Green. https://www.interactiongreen.com/wp-content/uploads/2020/05/Fake-news-self-check-decision-tree-2.png.

Anonymous. "Understanding the Infodemic and Misinformation in the Fight Against COVID-19." Published in 2020. 6 pages. Published by Pan American Health Organization. https://iris.paho.org/bitstream/handle/10665.2/52052/Factsheet-infodemic_eng.pdf?sequence=3.

Hassan, et al., "The Quest to Automate Fact-Checking." Published Oct. 2015. 6 pages. The Quest to Automate Fact-Checking. Proceedings of the 2015 Computation + Journalism Symposium. Published by Research Gate. https://www.researchgate.net/publication/301801279_The_Quest_to_Automate_Fact-Checking.

Katella, "A COVID-19 'Infodemic'? How to Make Sense of What You're Reading." Published Apr. 13, 2020. 6 pages. Published by Yale Medicine. https://www.yalemedicine.org/news/covid-19-infodemic.

Levy, "Social Media, News Consumption, and Polarization: Evidence from a Field Experiment." Published Mar. 2021. 40 pages. In American Economic Review, vol. 111, No. 3. Published by American Economic Association. https://www.aeaweb.org/articles?id=10.1257/aer.20191777.

Mell, et al., "The NIST Definition of Cloud Computing," Recommendations of the National Institute of Standards and Technology, U.S. Department of Commerce, Special Publication 800-145, Sep. 2011, 7 pgs.

Mok, "Deep Learning AI Tool Identifies 'Fake News' with Automated Fact Checking." Published Jan. 3, 2020. 10 pages. Published by The New Stack. https://thenewstack.io/deep-learning-ai-tool-identifies-fake-news-with-automated-fact-checking/.

Pennycook, et al., "Prior Exposure Increases Perceived Accuracy of Fake News." Published Apr. 25, 2017. 61 pages. Published by SSRN. https://papers.ssrn.com/sol3/papers.cfm?abstract_id=2958246.

Pennycook, et al., "The Implied Truth Effect: Attaching Warnings to a Subset of Fake News Headlines Increases Perceived Accuracy of Headlines Without Warnings." Published Feb. 21, 2020. 15 pages. Published by Informs Pubs Online. https://pubsonline.informs.org/doi/10.1287/mnsc.2019.3478.

Pennycook, et al., "Who Falls for Fake News? The Roles of Bullshit Receptivity, Overclaiming, Familiarity, and Analytic Thinking." Published Aug. 23, 2017. 63 pages. Published by SSRN. https://papers.ssrn.com/sol3/papers.cfm?abstract_id=3023545.

Shu, et al., "Detecting Fake News on Social Media." Published Jul. 1, 2019. 1 page. Published by Morgan & Claypool. Abstract Only. https://books.google.com/books?id=y7GhDwAAQBAJ.

Thorne, et al., "Automated Fact Checking: Task formulations, methods and future directions." Published Aug. 20, 2016. 14 pages. In Proceedings of the 27th International Conference on Computational Linguistics, pp. 3346-3359. Santa Fe, New Mexico, USA. https://www.aclweb.org/anthology/C18-1283.pdf.

Trotter, "Using UX psychology to thwart misinformation & orient Facebook as an ethical public utility." Published Mar. 30, 2020. Printed Mar. 4, 2021. 23 pages. Published by UX Collective. https://uxdesign.cc/using-ux-psychology-to-thwart-misinformation-orient-facebook-as-an-ethical-public-utility-e28f3dc37f8d.

Warzel, "How to Talk to Friends and Family Who Share Conspiracy Theories."Published Oct. 25, 2020. Printed Mar. 4, 2021. 3 pages. Published by The New York Times. https://www.nytimes.com/2020/10/25/opinion/qanon-conspiracy-theories-family.html?referringSource=articleShare.

* cited by examiner

PERSONALIZED ALERT GENERATION BASED ON INFORMATION DISSEMINATION

BACKGROUND

The present disclosure relates to information dissemination, and more specifically, to generating personalized alerts before dissemination of information.

Technology enables information to spread quickly and easily. Information may be factually accurate or factually inaccurate. Further, machine learning is becoming a prevalent tool in technology; machine learning may automatically update and improve functions by analyzing information and associations.

SUMMARY

Embodiments of the present disclosure include a system, method, and computer program product for personalized alerts. The embodiments may include a processor configured to perform operations. The operations may include analyzing interactions by a user within a network and generating a user profile for the user. The operations may further include identifying an attempt by the user to share a post via the network and prompting the user with a personalized alert to evaluate the post, wherein the personalized alert is generated based on the interactions, the user profile, and the properties of the post.

In some embodiments, defining the user profile includes assessing how the user engages with the network. Assessing how the user engages with the network may consider the scrolling speed of the user, the quantity of interactions of the user with content on the network, and the time between the interactions of the user with the content on the network.

In some embodiments, the interactions and the user profile are user data included in a corpus, the properties of the post are included in the corpus, the corpus is used to train a machine learning algorithm, and the machine learning algorithm generates the personalized alert. Some embodiments may further include receiving feedback from the user and integrating the feedback into the corpus.

Some embodiments may further include analyzing the interactions with the content on the network and assessing a reaction of the user based on the interactions.

In some embodiments, the properties of the post include a topic of the post and a popularity of the post.

Some embodiments may further include analyzing the properties, identifying one or more features based on the properties, comparing the properties to one or more historical properties, and determining the properties are above a reputation threshold. In some embodiments, the properties of the post may include the reputability of the origin of the post and the factual contentiousness of the post.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
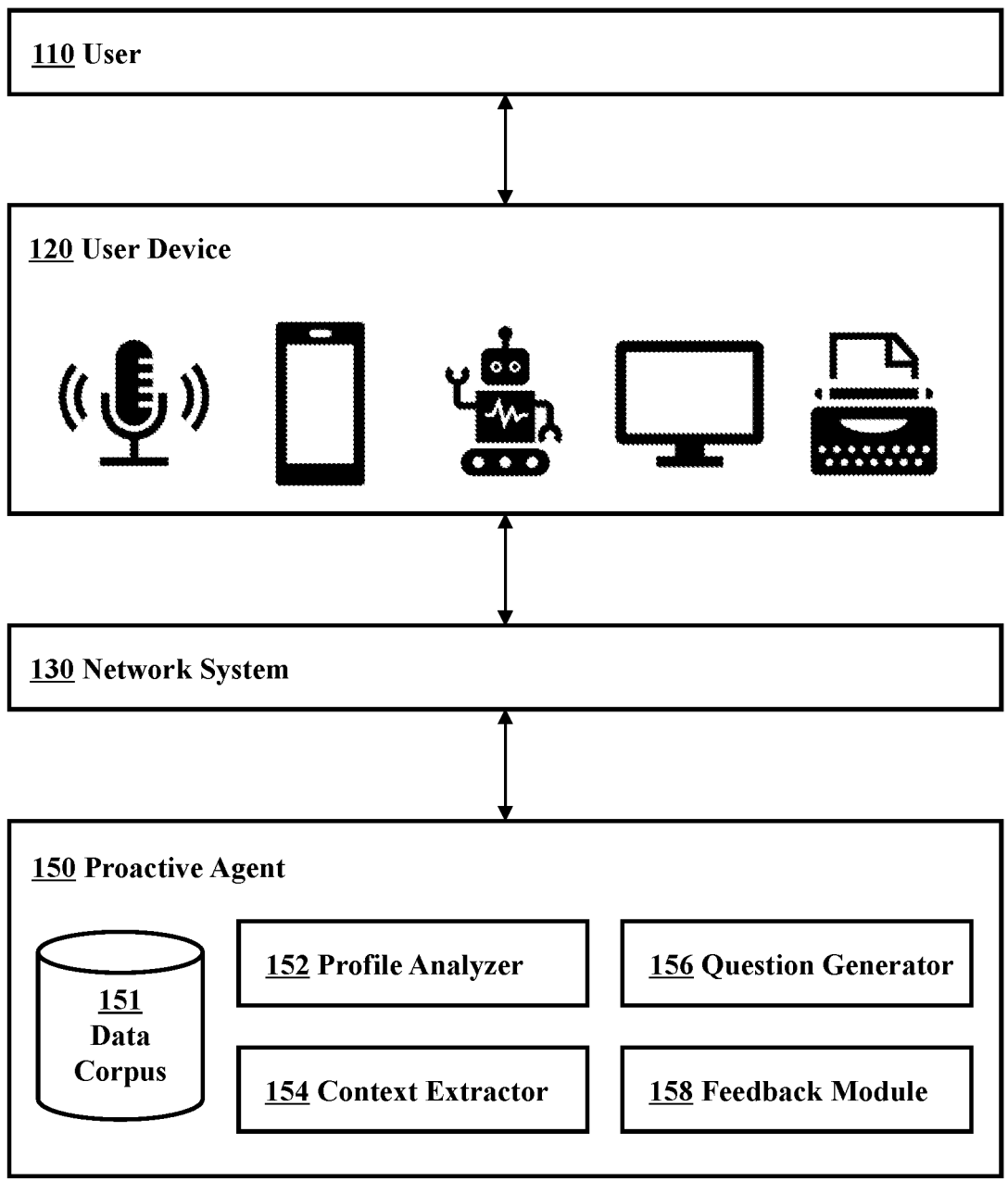
FIG. 1 illustrates a system of representative components in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to dissemination of information, and more specifically, to generating personalized alerts before dissemination of information.

Individuals may access and/or disseminate information. Information may be accessed and/or disseminated without regard for whether the information is factually accurate. Analytical thinking enables individuals to avoid thoughtlessly accepting consumed information, empowering an individual to assess the veracity of information before promulgating it. Analytical thinking may thus slow the spread of inaccurate material by encouraging individuals to actively decide whether or not to disseminate the information. Encouraging analytical thinking at the point of information consumption and/or dissemination may therefore slow the spread of inaccurate information.

Embodiments of the present disclosure may encourage individuals to engage in analytical thinking at the point of consumption and/or dissemination of information and thereby decrease dissemination of factually inaccurate information. Embodiments of the present disclosure may thus foster intellectual growth of the individual and slow the spread of factually inaccurate information while reducing or eliminating the effects of chilled speech.

Embodiments of the present disclosure include a system, method, and computer program product for personalized alerts to engage analytical thinking before dissemination of information. A system may include a memory and a processor in communication with the memory. The processor may be configured to perform operations that include analyzing interactions by a user within a network and generating a user profile for the user. The operations by the processor may further include identifying an attempt by the user to share a post via the network and prompting the user with a personalized alert to evaluate the post, wherein the personalized alert is generated based on the interactions, the user profile, and the properties of the post.

FIG. 1 illustrates a system 100 of representative components in accordance with some embodiments of the present disclosure. A user 110 may submit input to a user device 120. The user device 120 may submit the user input 110 to a network system 130. The network system 130 may make the input of the user 110 available to a proactive agent 150. The proactive agent 150 may encourage the user 110 to engage in analytical thinking.

A user 110 may submit input to a user device 120 capable of communicating with a network system 130. Embodiments of the present disclosure may be used with devices and systems currently in use or which may later be developed. A user device 120 may be, for example, a mobile phone, a computer, a communication device (e.g., a headset or data entry portal), a bot configured to communicate with a network system (e.g., a smart hub device), or the like.

The user device 120 may communicate with a network system 130. A network system 130 connects devices together. A network system 130 may be a system where a user 110 may interact, directly or indirectly, with one or more other individuals. A network system 130 may be, for example, a communications network, a website (e.g., an internet chat room), a communication client (e.g., a mobile application for communicating with other individuals), or a social network system (e.g., a social media platform).

The network system 130 may communicate with a proactive agent 150. The proactive agent 150 may encourage the user 110 to engage in analytical thinking. The proactive agent 150 may encourage analytical thinking by, for example, posing relevant questions for the user 110 to consider. The proactive agent 150 may collect information to assess which questions to pose to engage a user 110 in analytical thinking. Information may include, for example, how the user 110 has responded to similar questions, estimated bias of the user 110 for a particular post, feedback from the user 110, et cetera.

For example, the proactive agent 150 may contain data in a data corpus 151 that correlates posing "why" questions to a user 110 with a delay between the user 110 accessing information and the user 110 sharing the information whereas "how" questions are not correlated with any delay between the user 110 accessing information and the user 110 sharing the information. As a result, the proactive agent 150 may conclude the user 110 is more likely to engage in analytical thinking when "why" questions are posed than when "how" questions are posed. Such a conclusion may result in the proactive agent 150 increasing the frequency of "why" questions and decreasing the frequency of "how" questions.

The proactive agent 150 may include a data corpus 151, a profile analyzer 152, a context extractor 154, a question generator 156, and/or a feedback module 158. The proactive agent 150 may include a data corpus 151 to store data collected for question development, question data, user preferences, user data, user feedback, question recommendations, machine learning (ML) models, and the like. The data corpus 151 may be used to develop questions and/or ML models for developing questions for personalized alerts to a user 110 to engage analytical thinking. The data corpus 151 may draw on information from various sources such as, e.g., direct input from the user 110, one or more profiles the user 110 selects for analysis, storage devices, the internet, and the like.

The proactive agent 150 may include a profile analyzer 152 to analyze user data. The profile analyzer 152 may draw on information contained in the data corpus 151 for analysis. For example, a profile may be pulled to the data corpus 151 and stored in the data corpus 151, and the profile analyzer 152 may analyze the profile while it is in the data corpus 151. The profile analyzer 152 may contribute data to the data corpus 151. For example, the profile analyzer 152 may pull profile data from the data corpus 151 or another source, analyze the profile data, and submit the profile data and/or any insights garnered from analyzing the profile data to the data corpus 151.

In some embodiments, the proactive agent 150 may include a context extractor 154. The context extractor 154 may extract the context of a post the user 110 views. The context extractor 154 may use the context of the post to assist in determining whether the user 110 is likely to experience partiality with respect to the post. In collaboration with the profile analyzer 152, the context extractor 154 may also assist in determining what kind of partiality a user may experience with respect to the post. Identifying one or more potential partialities may aid a question generator 156 in generating questions personalized to the user 110 to engage the user 110 in analytical thinking with respect to a post the user 110 is currently viewing.

Insights garnered from the profile analyzer 152 analyzing profile data and from the context extractor 154 extracting post content may be stored in the data corpus 151 for use by a question generator 156. The question generator 156 may produce personalized questions to engage the user 110 in analytical thinking. Profile data, post content, insights generated by the profile analyzer 152, and/or insights garnered by the context extractor 154 may be used to generate questions directly or may be used to generate data which may then be used to generate questions. Questions generated by the question generator 156 may be used to engage the user 110 in thinking analytically about the post. In some embodiments, the proactive agent 150 may prompt the user 110 with questions as the user 110 considers sharing content.

The question generator 156 may prompt the user 110 with one or more questions depending on the data collected, insights generated from the context of the post as determined by the context generator 154, insights generated from the profile data as determined by the profile analyzer 152, or some combination thereof. Questions may prompt the user 110, for example, to ask how the post made the user 110 feel, whether the user 110 has seen similar content hosted by other sources, and whether the user 110 believes the source is reliable.

The question generator 156 may select one or more questions presented to the user 110 from a set of preloaded questions. For example, the data corpus 151 may include questions curated by experts to maximize their ability to evoke an analytical response from the user 110. Questions included in the data corpus 151 may all be curated by experts, mostly curated by experts, curated in part by experts, or derived from questions curated by experts. In some embodiments, the question generator 156 may select one or more questions from a list of expert-curated questions in the data corpus 151 to display to the user 110 to engage the user 110 in analytical thought. In some embodiments, the question generator 156 may incorporate data about the user 110 and/or the content of a post to select one or more questions from a list of expert-curated questions.

The proactive agent 150 may further include a feedback module 158. The feedback module 158 may provide a mechanism for the user 110 to provide feedback, directly or indirectly, to the proactive agent 150. Feedback the user 110 submits may be integrated into the data corpus 151 and/or used to adjust the proactive agent 150. For example, the user 110 could provide feedback through the feedback module 158 that the proactive agent 150 is posing too many questions and should ask fewer questions to increase efficacy; the proactive agent 150 may integrate this information into the data corpus 151 and decrease the number of questions on a standard prompt from four questions to three questions.

In some embodiments, the interactions of the user 110 and a user profile are user data included in the data corpus 151. In some embodiments, properties of the post (e.g., context insights generated by the context extractor 154) are included in the data corpus 151. In some embodiments, the data corpus 151 may be used to train an algorithm (e.g., a ML algorithm), and the ML algorithm may include a question generator 156 that generates the personalized alert for the user 110. Some embodiments may further include receiving feedback from the user and integrating the feedback into the corpus.

Figure 2:
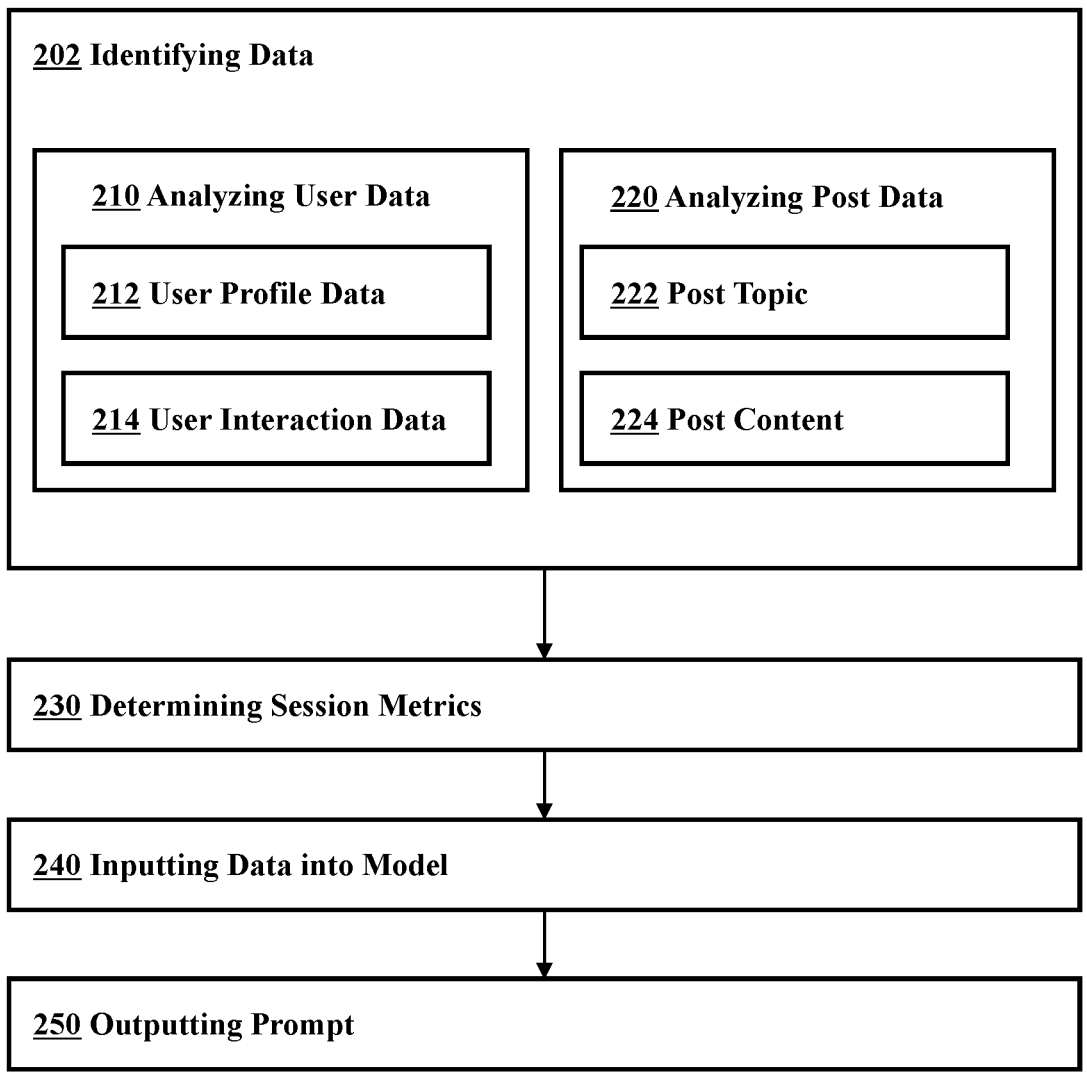
FIG. 2 depicts a flowchart of generating analytical engagement in accordance with some embodiments of the present disclosure.

FIG. 2 depicts a flowchart of the process 200 of generating analytical engagement in accordance with some embodiments of the present disclosure. The process 200 may include identifying data 202, determining session metrics 220, inputting data into a model 240, and outputting a prompt 250. The process 200 may be performed, in whole or in part, by a processor.

The identifying data 202 may include analyzing user data 210. User data may include user profile data 212 and/or user interaction data 214. User profile data 212 may include information about a user collected from a user profile. User profile data 212 may include, for example, user demographics, affiliations, geography, interests, work history, favorite books, et cetera. User interaction data 214 may include actions by the user to interact with a platform or service. User interaction data 214 may include, for example, user likes, comments, and shares; user scroll speed; user clicks over time; user reactions over time; and similar information.

Analyzing user data 210 may result in assessing a user profile based on user information. A user profile may be assessed using historical user information and/or current user information. In some embodiments, historical user information may be used to assess a user profile and information from a session which the user is currently engaged in may be compared to the user profile to evaluate a deviation of the user from historical use. In some embodiments, a system may associate a deviation from a historically derived profile as a deviation in user temperament and may change outputs accordingly. For example, data indicating deviation by the user may indicate that the user is frustrated, and thus the system will output one question to prompt analytical thinking instead of three.

In some embodiments, a user profile may be defined, and defining the user profile may include assessing how the user engages with the network. Assessing how the user engages with the network may consider the scrolling speed of the user, the quantity of interactions of the user with content on the network, and the time between the interactions of the user with the content on the network.

In some embodiments, the user profile may include various details about the user. Details about a user may be referred to as user data. User data may include one or more activities of the user such as likes, shares, and/or comments. User data may include one or more connections of the user, such as affiliations, interests, and influence. Data collected and/or used in personalization may be set according to default settings, set by the user, or some combination thereof. For example, a user may decide that information about user likes may be collected and used whereas information about user shares may not be collected or used.

User data may be collected from a profile of the user, input from the user, metadata about such information, or some combination thereof. For example, a user may request a personalization engine collect user data from an existing public-facing profile. An example of direct input may be a user taking a personalization quiz; another example of direct input may be the user submitting feedback to the system.

User data may be used to identify partiality or favoritism of a user. Partiality may distort rational thought processes and prevent an individual from making sound decisions. Types of partiality of an individual may include, for example, confirmation bias, anchoring bias, the halo effect, the availability heuristic, optimism bias, et cetera. Partiality may be identified using methods known in the art or hereinafter developed. In some embodiments, partiality may be assessed by analyzing the historical topics the user browsed or interacted with; for example, if a user viewed many posts about a particular topic, it may indicate the user has partiality towards that particular topic. Identifying partiality of a user may enable the system to highlight the partiality to the user. Identifying partiality may enable the user to compensate for the partiality such as, for example, by more critically analyzing information when an identified partiality is present.

Identifying data 202 may include analyzing post data 220. Post data may include post topic 222 and post content 224. Post analysis algorithms may be used to analyze the post topic 222 and the post content 224; for example, a latent Dirichlet allocation (LDA) model may be used to assess post topic 222 and/or post content 224. Other analysis algorithms, such as a latent semantic indexing (LDI) model, may be used. The post topic 222 may be identified by processing the post with a trained classifier to categorize the post according to the type of information or keywords the post contains. The post content 224 may be identified by processing the post with a trained classifier to categorize the post according to the content.

The post topic 222 and/or post content 224 may be considered post properties or properties of the post. In some embodiments, the properties of the post include a title and/or topic of the post and a popularity of the post. The popularity of the post may be a measure of virality of the post such as whether the post has gone viral or the likelihood of the post going viral. The popularity of the post may be measured by, for example, how many views and/or shares the post has garnered in a certain span of time.

The same trained classifier may be used to analyze both post topic 222 and post content 234; alternatively, different trained classifiers may be used to for different components of analyzing post data 220. Trained classifiers may be trained, retrained, and updated to improve identification and/or analyzing processes. In some embodiments, data gathered from user input (e.g., user feedback) may be used to retrain the models identifying and/or analyzing data.

Some embodiments may further include analyzing the properties, identifying one or more features based on the properties, comparing the properties to one or more historical properties, and determining the properties are above a reputation threshold. In some embodiments, the properties of the post may include the reputability of the origin of the post and the factual contentiousness of the post.

The process 200 may include determining session metrics 230. Metrics of the session may include navigation patterns. Determining session metrics 230 may include assessing navigation patterns of a user. Navigation patterns of a user may include, for example, user scroll speed, clicks over time, types of posts interacted with (e.g., recordings, images, or articles), types of content interacted with (e.g., comedy sketches or documentaries), number of posts interacted with in a given period of time, and similar information. Determining session metrics 230 may include comparing current navigation patterns of a user to historical navigation patterns of the user. For example, a user may typically read historical documentary articles; a change in user navigation patterns may be detected if the user watches comedy skits.

Some embodiments may include analyzing the interactions with the content on the network and assessing a reaction of the user based on the interactions. For example, user data may indicate that the user has an average of ten clicks per minute; if the user engages in a session averaging fifteen clicks per minute, the system may interpret the disposition of the user to be in an enthusiastic state. Alternatively, if a user averages ten clicks per minute and the user engages in a session averaging six clicks per minute, the system may interpret the disposition of the user to be in a weary state.

The process 200 may include inputting data into a model 240. The model may be a ML model. In some embodiments, the ML model may be a supervised ML algorithm. The model may integrate session metrics, user data, and post data. The model may use any integrated and/or available data as input to generate one or more questions for a user and/or statements to encourage the user to engage in analytical thinking. The model may generate one or more questions for the user by, for example, classifying the input data into one or more sets of questions and selecting the one or more questions from these sets, selecting the one or more questions from a list of questions preloaded to a database, forming one or more new questions (e.g., using curated questions and feedback data to conjure additional questions), or some combination thereof.

The process 200 may include outputting prompt 250. The questions and/or statements for encouraging analytical thinking which were generated by the model may be output on a prompt for the user to view and/or engage with. Some embodiments may include user settings to select a certain type of cue. For example, some users may select the prompt to be a visual cue (e.g., a pop-up screen or a tag connected to a post), some users may select an auditory prompt (e.g., a bot may read aloud a question generated by a model), and some users may select a combination thereof (e.g., five questions may be displayed visually and one of the questions is read aloud by a bot).

The state of the user (e.g., enthusiastic or weary) may contribute to one or more reactions of the user, and the system may adapt accordingly. For example, the system may provide fewer questions to a user in a weary state than a user in an enthusiastic state. In another example, the system may present simpler questions to a user in a weary state and more complicated questions to a user in an enthusiastic state.

Figure 3:
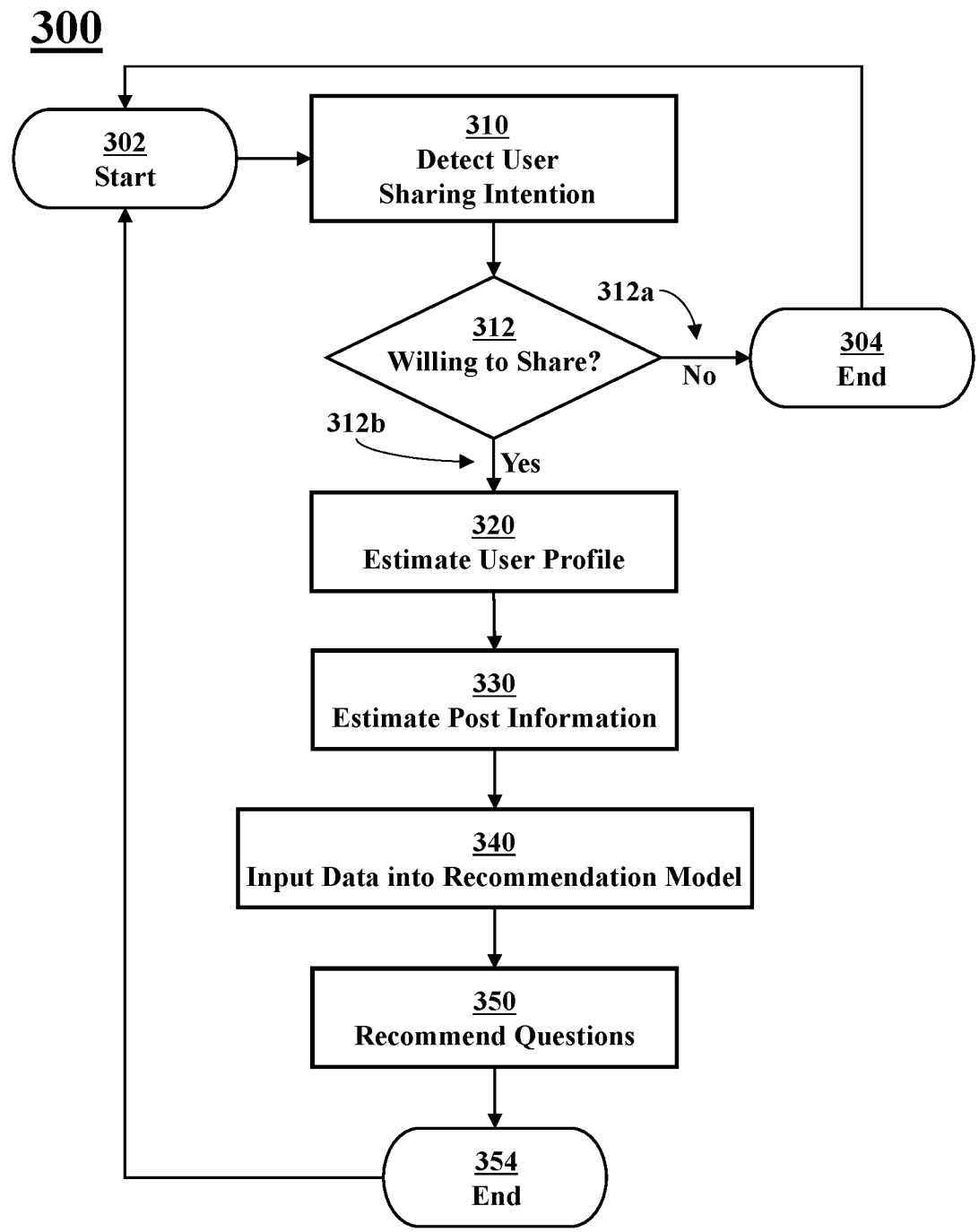
FIG. 3 illustrates a system decision tree in accordance with some embodiments of the present disclosure.

FIG. 3 illustrates a system decision tree 300 in accordance with some embodiments of the present disclosure. The system decision tree 300 may lead a system from a first position (e.g., a start 302 position), through detections, inputs, and outputs of the system, to a completion of a decision (e.g., an end 354 position) and back to a first position.

A system may start 302 in a dormant or resting state awaiting and monitoring for user activity. The system may detect user intention to share a post 310. The system may detect whether the user is willing to share the post 312 by, for example, observing a user pressing a share button. If the user is unwilling 312a to share the post, the analysis may end 304 and return the system to its original start 302 state.

If the user is willing 312b to share the post, the decision tree and analysis therefor may continue. The system may estimate a user profile 320 to continue the decision tree. Estimating the user profile may include compiling and assessing user demographic data, historical inputs, and similar information to approximate habits, biases, and other likely characteristics of the user. The system may estimate a user profile 320 to optimize personalization of alerts for the user. For example, the profile of a first user may indicate the first user is analytically engaged by questions about the feelings of the first user; the profile of a second user may indicate that the second user is analytically engaged by questions citing numerical data from one or more external sources.

The system may estimate the post information 330. Estimating information of a post may include assessing the title, topic, and/or content of the post. The system may use an algorithm (e.g., a post analysis algorithm) to estimate the post information 330. Post information may be used to assess the popularity of a post, interest to the user, contentiousness of the post, and other data.

Post information may be used in concert with the user profile to personalize an alert specific to the user. For example, a first user may be inclined to share a post because the post aligns with the views of the first user; the personalized alert may therefore include a question to evoke analytical thinking with respect to confirmation bias. In another example, a second user may be inclined to share a post because the post induces an emotional response; the personalized alert may thus include a question about the reaction of the user in the personalized alert.

The system may then input data into recommendation model 340. The data input into the recommendation model may include user profile data, post information, user feedback (e.g., user input from one or more previous prompts), and similar information. The recommendation model may be a ML model.

The system may then recommend questions 350 which may be used to prompt a user. The questions may be alerts personalized to the user given the circumstances such as, for example, recent reactions of the user, post content, and historical user profile data. The recommended questions may be presented to the user to prompt the user to engage in analytical thinking before the user interacts with or propagates a particular post. For example, a user may read an article, and the system may include a tag at the end of the article and above an integrated share button; the tag may pose questions for the user to thoughtfully consider the content of the post before clicking the share button.

The system decision tree 300 may end 354 after recommending one or more questions. The system decision tree 300 may then return to its original start 302 state and remain dormant until it detects a sharing intention of the user 310, at which point the system decision tree 300 may start again.

Figure 4:
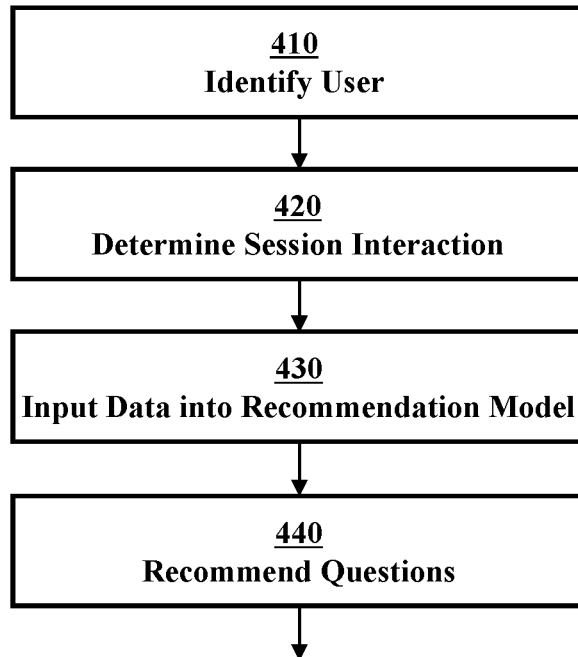
FIG. 4 depicts a flowchart of data compilation in accordance with some embodiments of the present disclosure.

FIG. 4 depicts a flowchart of data compilation 400 in accordance with some embodiments of the present disclosure. The system may identify a user 410, determine session interaction 420 of the identified user, input data into recommendation model 430, recommend questions 440 based on the data collected and the recommendation model used, and select one or more personalized alerts from a recommendations matrix 450 based on the incorporated data. The recommendations matrix 450 may be used to present personalized alerts to a user that encourage the user to engage in analytical thinking, effectively slowing the spread of information while still enabling the sharing of information and ideas. The present disclosure may thereby enable intellectual growth of users and slow the spread of factually inaccurate information without chilling speech (e.g., removing posts by an administrator).

The system may identify a user 410 by collecting user profile information such as, for example, demographics of the user, a history of the interactions of the user, user interests and interactions, and similar user information. The user may opt in or opt out of any personalization; for example, a user may indicate that the system may use work history data for personalization purposes but may not use geographic location history for the same personalization purposes.

The system may also identify a user 410 based on additional information provided by the user. In some embodiments, the system may include the reaction history of the user to identify a current reaction of the user and thereby enhance personalization. The system may include user feedback to incorporate user preferences, settings, and other data into user identification. In some embodiments, user feedback may be directly expressed; for example, a user may command the system to incorporate certain preferences, or the user identifies to the system that a particular question engaged the user in analytical thought. In some embodiments, user feedback may be implicit; for example, the system may recognize certain questions result in a five second pause before user clicks a share button whereas other questions result in only a two second pause before the user clicks the share button.

The system may determine session interaction 420 of the user. The system may aggregate data from previous user sessions and compare the current session to previous sessions. Session interaction data may include, for example, user experience (UX) navigation patterns such as scrolling speed, clicks over time, and reactions over time. The information may be used, for example, to identify user reactions and/or mood in the current session. The information may integrate post data (e.g., post topics and/or content); the system may use, for example, an analysis algorithm (e.g., LDA or LSI) to identify post data. The system may further extract features from the user data and the post data based on contextualized information.

User profile data and session information may be aggregated and used as training or other input data for a recommendation model 430. The recommendation model may be or include a classification model, for example, a support-vector machine (SVM) model, a logistic regression model, a deep neural network (DNN) model, or the like. User data, post data, user interaction data, user reaction data, post content, and/or extracted features thereof may be incorporated as training data for the recommendation model.

Data, whether collected or developed, may be aggregated into a recommendations matrix 450. The recommendations matrix 450 may include inputs of user data 450*a* and post data 450*b*. The user data 450*a* and post data 450*b* may be used to generate output data 450*c*.

User data 450*a* may include information about a user. User data 450*a* may include user profile data 451 and reaction data 452. Profile data 451 may include information which a user may include in a profile, similar identification system, or other information about a user. Profile data 451 may include, for example, user individual information (e.g., geography, education, etc.), historical data (e.g., interactions with posts, scroll speeds, and reactions to content), interests (e.g., followed content provider types, book wish list content, and trends in historical data), and the like. Profile data 451 may be kept for one or more users 451*a*-451*c*. Reaction data 452 may include information about the dispositions 452*a*-452*c* for each of the one or more users 451*a*-451*c*.

Post data 450*b* may include information about posts which the one or more users 451*a*-451*c* are considering sharing. Post data 450*b* may include post topic 453, popularity 454, and accuracy 455. Different posts may have different topics 453*a*-453*c*. A post may have one or more topics; for example, a post discussing the optimal outfit for enjoying pizza may be tagged with both "fashion" and "food" identifiers. Each post may have a popularity rating 454*a*-454*c* to indicate whether the post is viral or how likely the post is to go viral. Each post may also have an accuracy rating 455*a*-455*c* to indicate whether the post is factual or opinion in nature and/or how contentious any facts stated in the post are.

Post data 450*b* may further include information about popularity 454. Popularity 454 may indicate how many users are currently engaged by a post, how many users previously engaged with the post, how viral the post currently is, how likely it is for the post to become viral, and similar information. Popularity 454 for a post may vary based on trends, time of day, day of the week, how popular other posts in similar categories are, and the like. Popularity 454 will thus vary both by post as well as the timing of the user viewing the post. Popularity tags 454*a*-454*c* may thus change over time even for the same post.

Post data 450*b* may be normalized. For example, a post topic 453 may be selected from a set of topics (e.g., health, current events, fashion, and/or culinary). Numerical identifiers such as popularity 454 and accuracy 455 may be normalized numerically or on a preset scale. For example, the popularity 454 of a post may be numerically normalized between zero and one such that a rating of 0.1 indicates that a post is not likely to go viral whereas a rating of 0.99 indicates that the post already is viral. Similarly, accuracy 455 may use a rating system normalized between zero and one such that a 0.1 rating indicates the post contradicts reputable sources, a 0.5 rating indicates the post is unverifiable (e.g., no comparable data is available or the post is opinion), and a 0.99 rating indicates the post is verifiable via numerous reputable sources. A present scale may use a linguistic range; for example, a popularity range may include not viral, unlikely to go viral, potentially viral, almost viral, and currently viral.

Post data 450*b* may be kept for each post available for sharing. For example, the topic 453 of each post may vary such that several posts have several topic tags 453*a*-453*c*. The topic tags 453*a*-453*c* may be specific to each post. The topic tags 453*a*-453*c* may be entirely unique, similar, identical, have both distinctions and overlap, or some combination thereof.

Inputting user data 450*a* and post data 450 into a recommendations matrix 450 may result in an output 450*c*. The output 450*c* may include a question set 457 specifically developed to engage a particular user with analytical thinking. Question sets 457*a*-457*c* may vary based on the user data 450*a*, the post data 450*b*, and any models used in generating question sets 457*a*-457*c* (including the model training data). Question sets 457*a*-457*c* may then be used to prompt users with personalized alerts.

For example, a first question set 457*a* may include: Are you sure you want something that is probable to be inaccurate? Does the person or organization that produced the post have known editorial standards? Because the post may be aligned with your own views, would you like to check the information with another source before propagating the information?

For example, a second question set 457b may include: Did this post amplify any negative feelings? Are you willing to share something that may be perceived as harmful by other people? Are you willing to share a post that may encourage imprudent behavior?

For example, a third question set 457c may include: Do you think the source is reliable? Are you willing to share something that is probable to be inaccurate? Is the content of the post aligned with the publications of any expert organizations?

Question sets 457a-457c may be selected from a set of questions curated by experts. Questions may include, for example, whether the user checked any factual contentions of the post; how the post made the user feel; whether the post amplified any particular feelings of the user; whether the user is willing to share something with a certain accuracy rating; if the user would like to verify data before sharing the post; whether the user is willing to share a post that may contain factually inaccurate information; how people that the user may influence by propagating the post may react to the post; whether the user believes the post to be reliable; whether the user trusts the source of the post; whether the user believes the accuracy of the content in the post; whether factual contentions in the post align with statements made by reputable organizations; whether the organization that produced the post has specified editorial standards; whether the user may be experiencing confirmation bias; and similar questions.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
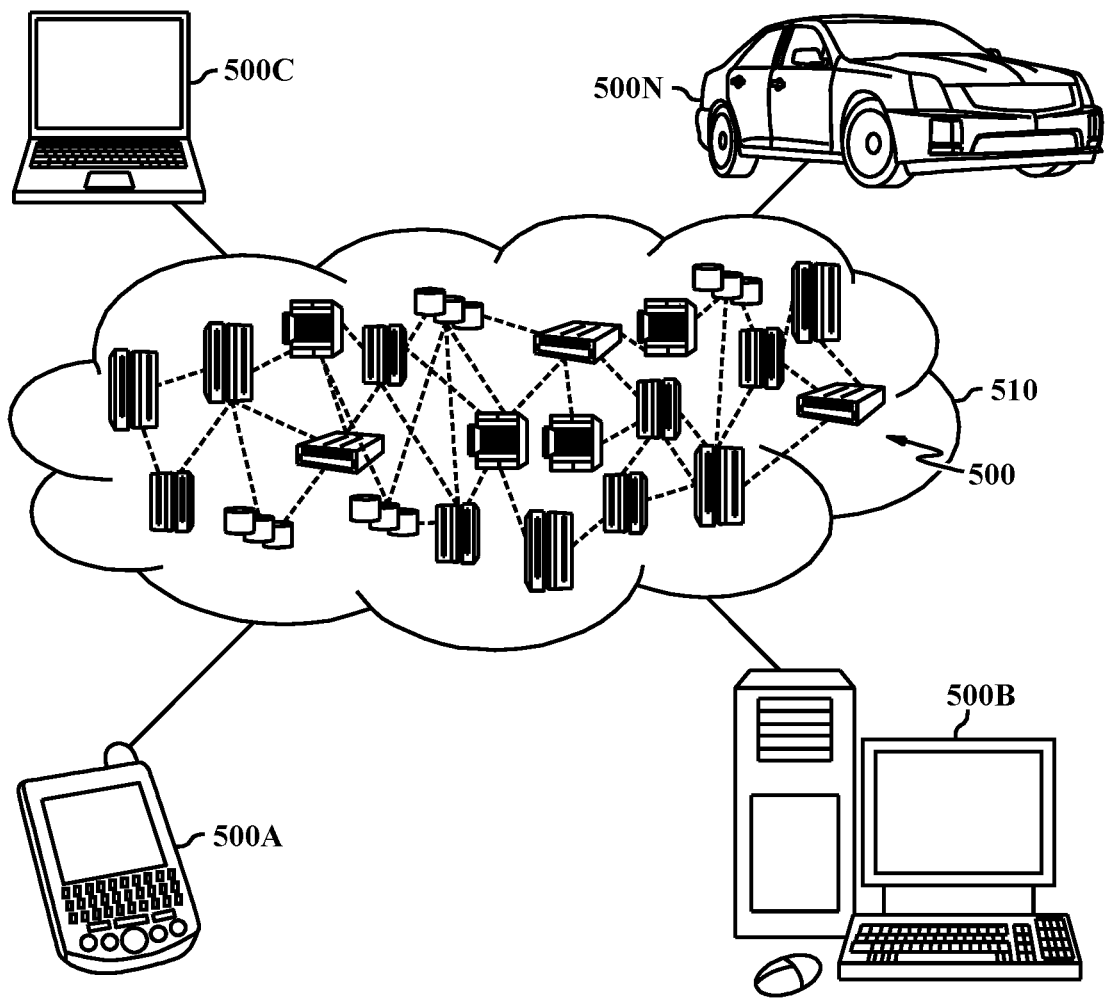
FIG. 5 illustrates a cloud computing environment according to an embodiment of the present invention.

FIG. 5 illustrates a cloud computing environment 510 in accordance with embodiments of the present disclosure. As shown, cloud computing environment 510 includes one or more cloud computing nodes 500 with which local computing devices used by cloud consumers such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as private, community, public, or hybrid clouds as described hereinabove, or a combination thereof.

This allows cloud computing environment 510 to offer infrastructure, platforms, and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
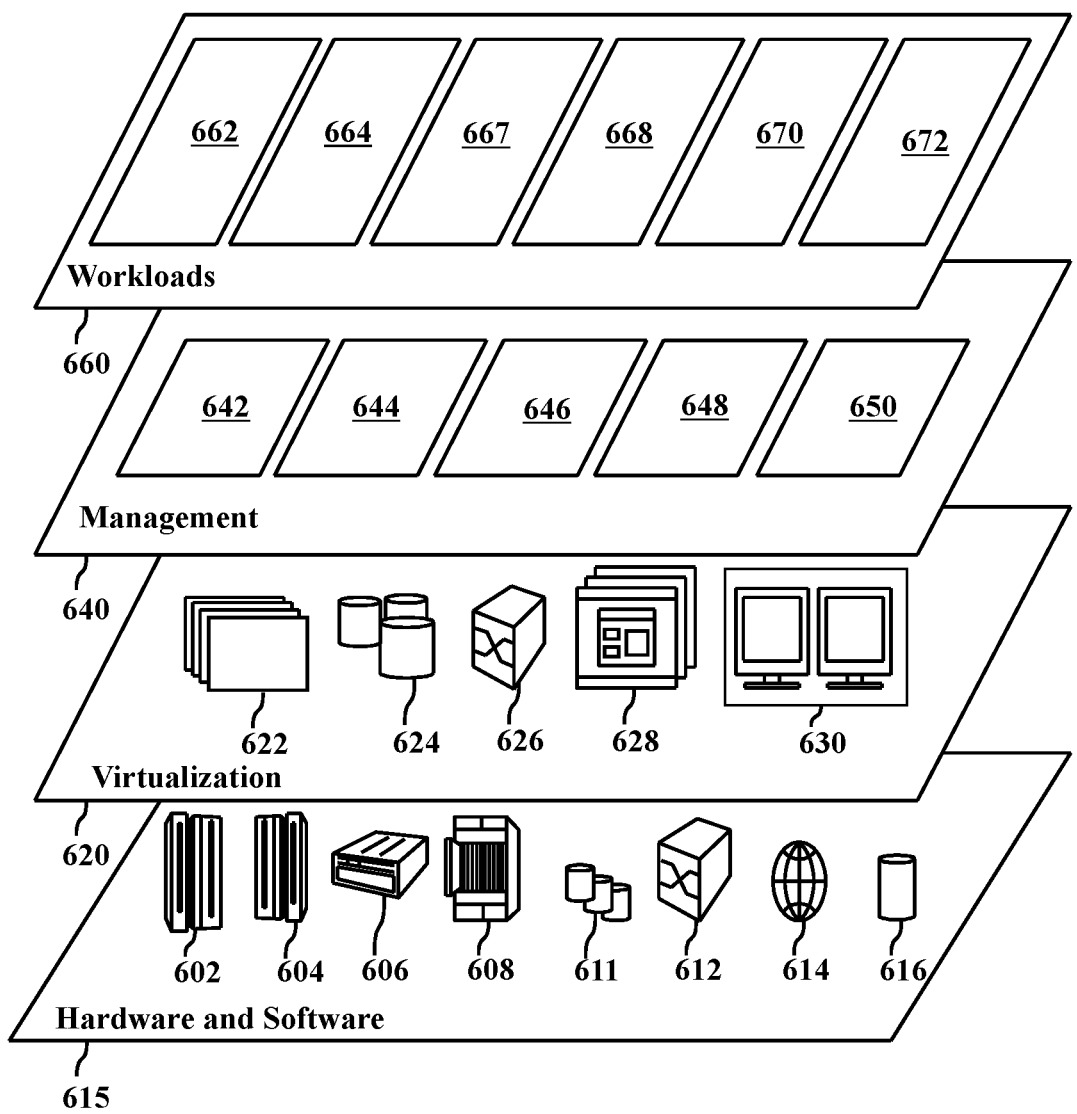
FIG. 6 depicts abstraction model layers according to an embodiment of the present invention.

FIG. 6 illustrates abstraction model layers 600 provided by cloud computing environment 510 (of FIG. 5) in accordance with embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 615 includes hardware and software components. Examples of hardware components include: mainframes 602; RISC (Reduced Instruction Set Computer) architecture-based servers 604; servers 606; blade servers 608; storage devices 611; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and pricing 644 provide cost tracking as resources are and are utilized within the cloud computing environment as well as billing or invoicing for consumption of these resources. In one example, these resources may include application software licenses. Security provides identity verification for cloud consumers and tasks as well as protection for data and other resources. User portal 646 provides access to the cloud computing environment for consumers and system administrators. Service level management 648 provides cloud computing resource allocation and management such that required service levels are met. Service level agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 667; data analytics processing 668; transaction processing 670; and personalized alerts to engage analytical thinking 672.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or which may be later developed.

Figure 7:
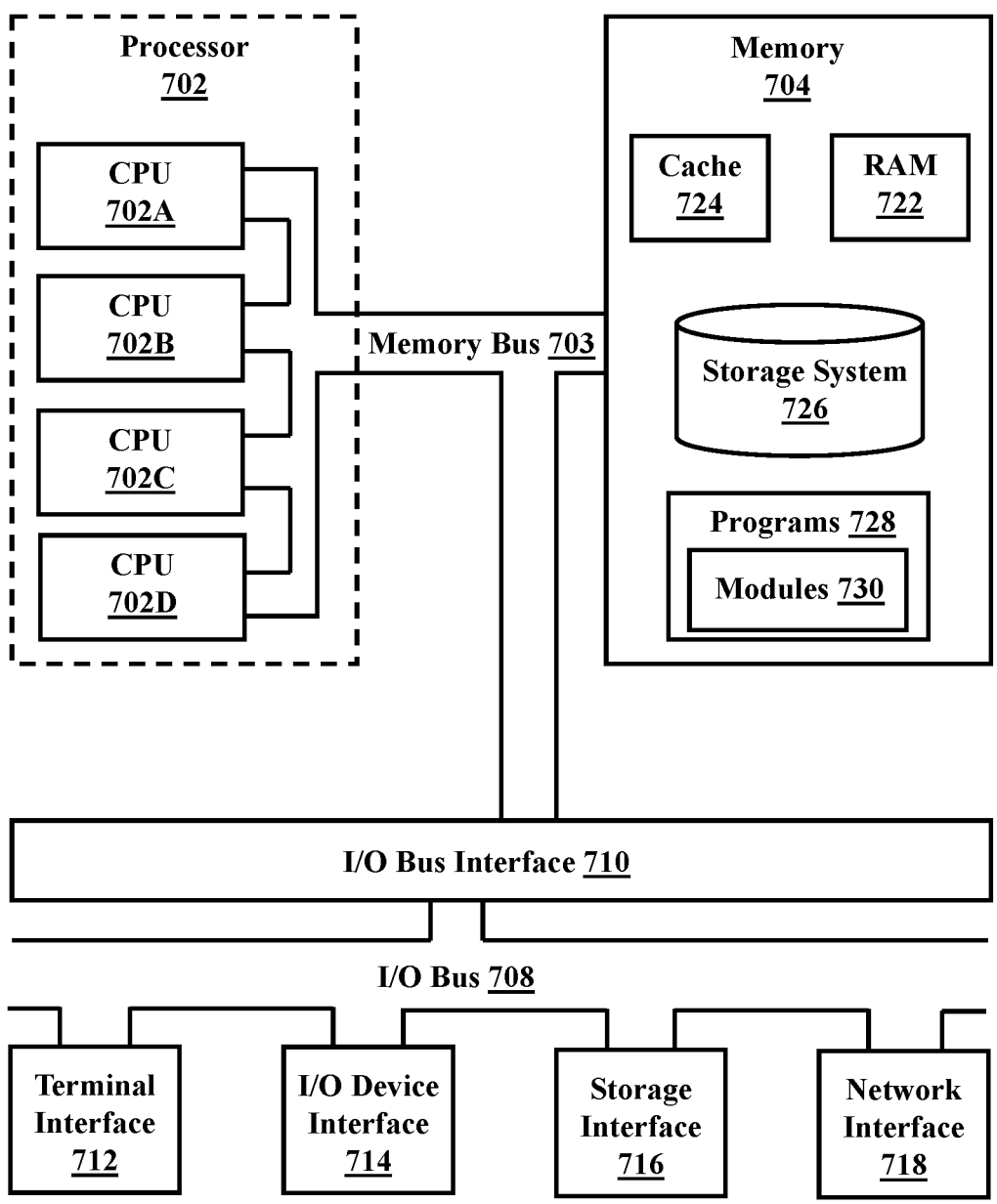
FIG. 7 illustrates a high-level block diagram of an example computer system that may be used in implementing one or more of the methods, tools, and modules, and any related functions, described herein, in accordance with embodiments of the present disclosure.

FIG. 7 illustrates a high-level block diagram of an example computer system 701 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 701 may comprise a processor 702 with one or more central processing units (CPUs) 702A, 702B, 702C, and 702D, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable CPUs 702A, 702B, 702C, and 702D, herein generically referred to as the CPU 702. In some embodiments, the computer system 701 may contain multiple processors typical of a relatively large system; however, in other embodiments, the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730, may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units 710 are shown, which separate the I/O bus 708 from various communications paths running to the various I/O devices, in other embodiments some or all of the I/O devices may be connected directly to one or more system I/O buses 708.

In some embodiments, the computer system 701 may be a multi-user mainframe computer system, a single-user system, a server computer, or similar device that has little or no direct user interface but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
a memory; and
a processor in communication with said memory, said processor being configured to perform operations comprising:
analyzing historical interactions by a user within a network, wherein said historical interactions include historical user interaction data selected from the group consisting of user scroll speed and user clicks over time, and wherein said interactions are included in a corpus;
generating a user profile for said user, wherein said user profile includes an historical use by said user, and wherein said user profile is included in said corpus;
training a machine learning algorithm using said corpus;
monitoring current session interactions by said user within said network during a current user session, said current session interactions selected from the group consisting of user scroll speed and user clicks over time;
identifying an attempt by said user to share a post via said network during said current user session;
extracting a context from said post;
detecting a deviation of said attempt by said user to share said post from said historical use by said user based on a comparison of said current session interactions to said historical user interaction data;
determining said deviation indicates a current user temperament;
quantifying a user post partiality, wherein said user post partiality quantifies a partiality that said user has for said post, and wherein said user post partiality is based on said interactions, said user profile, and said context;
generating a personalized alert to evaluate said post with said machine learning algorithm, wherein said personalized alert is personalized to said user to engage said user in analytical thinking, wherein said personalized alert is personalized to said user based on said corpus, said context, and said user post partiality, and wherein said personalized alert includes a question for said user;
adapting said personalized alert to said user based on said current user temperament, wherein said adapting said personalized alert includes adjusting a complexity of said question based on said current user temperament; and
prompting said user with said adapted personalized alert during said current user session on said network before said user shares said post.

2. The system of claim 1 wherein defining said user profile comprises:
assessing how said user engages with said network, wherein said assessing considers scrolling speed of said user, quantity of interactions of said user with content on said network, and time between said interactions of said user with said content on said network.

3. The system of claim 1 wherein:
said properties of said post are included in said corpus.

4. The system of claim 3 further comprising:
receiving feedback from said user; and
integrating said feedback into said corpus.

5. The system of claim 1 further comprising:
analyzing said interactions with said content on said network; and
assessing a reaction of said user based on said interactions.

6. The system of claim 1 wherein:
said properties of said post include a topic of said post and a popularity of said post.

7. The system of claim 1 further comprising:
analyzing said properties;
identifying one or more features based on said properties;
comparing said properties to one or more historical properties; and
determining said properties are above a reputation threshold.

8. A computer-implemented method, said method comprising:
analyzing, by a processor, historical interactions by a user within a network, wherein said historical interactions include historical user interaction data selected from the group consisting of user scroll speed and user clicks over time, and wherein said interactions are included in a corpus;

generating, by said processor, a user profile for said user, wherein said user profile includes an historical use by said user, and wherein said user profile is included in said corpus;

monitoring, by said processor, current session interactions by said user within said network during a current user session, said current session interactions selected from the group consisting of user scroll speed and user clicks over time;

training, by said processor, a machine learning algorithm using said corpus;

identifying, by said processor, an attempt by said user to share a post via said network during said current user session;

extracting, by said processor, a context from said post;

detecting, by said processor, a deviation of said attempt by said user to share said post from said historical use by said user based on a comparison of said current session interactions to said historical user interaction data;

determining said deviation indicates a user temperament deviation;

quantifying, by said processor, a user post partiality, wherein said user post partiality quantifies a partiality that said user has for said post, and wherein said user post partiality is based on said interactions, said user profile, and said context;

generating, by said processor, a personalized alert to evaluate said post with said machine learning algorithm, wherein said personalized alert is personalized to said user to engage said user in analytical thinking, wherein said personalized alert is personalized to said user based on said corpus, said context, and said user post partiality, and wherein said personalized alert includes a question for said user;

adapting said personalized alert to said user based on said user temperament deviation, wherein said adapting said personalized alert includes adjusting a complexity of said question based on said user temperament deviation; and prompting, by said processor, said user with said adapted personalized alert during said current user session on said network before said user shares said post.

9. The method of claim 8 wherein defining said user profile comprises:

assessing, by said processor, how said user engages with said network, wherein said assessing considers scrolling speed of said user, quantity of interactions of said user with content on said network, and time between said interactions of said user with said content on said network.

10. The method of claim 8 wherein:
said properties of said post are included in said corpus.

11. The method of claim 10 further comprising:
receiving, by said processor, feedback from said user; and
integrating, by said processor, said feedback into said corpus.

12. The method of claim 8 further comprising:
analyzing, by said processor, said interactions with said content on said network; and
assessing, by said processor, a reaction of said user based on said interactions.

13. The method of claim 8 wherein:
said properties of said post include a topic of said post and a popularity of said post.

14. The method of claim 8 further comprising:
analyzing said properties;
identifying one or more features based on said properties;
comparing said properties to one or more historical properties; and
determining said properties are above a reputation threshold.

15. A computer program product, said computer program product comprising a computer readable storage medium having program instructions embodied therewith, said program instructions executable by a processor to cause said processor to perform a function, said function comprising:

analyzing historical interactions by a user within a network, wherein said historical interactions include historical user interaction data selected from the group consisting of user scroll speed and user clicks over time, and wherein said interactions are included in a corpus;

generating a user profile for said user, wherein said user profile includes an historical use by said user, and wherein said user profile is included in said corpus;

monitoring current session interactions by said user within said network during a current user session, said current session interactions selected from the group consisting of user scroll speed and user clicks over time;

identifying an attempt by said user to share a post via said network during said current user session;

extracting a context from said post;

detecting a deviation of said attempt by said user to share said post from said historical use by said user based on a comparison of said current session interactions to said historical user interaction data;

determining said deviation indicates a current user temperament;

quantifying a user post partiality, wherein said user post partiality quantifies a partiality that said user has for said post, and wherein said user post partiality is based on said interactions, said user profile, and said context;

generating a personalized alert to evaluate said post with a machine learning algorithm, wherein said personalized alert is personalized to said user to engage said user in analytical thinking, wherein said personalized alert is personalized to said user based on said corpus, said context, and said user post partiality, and wherein said personalized alert includes a question for said user;

adapting said personalized alert to said user based on said user temperament deviation, wherein said adapting said personalized alert includes adjusting a complexity of said question based on said user temperament deviation; and prompting said user with said adapted personalized alert during said current user session on said network before said user shares said post.

16. The computer program product of claim 15 further comprising:
analyzing said properties;
identifying one or more features based on said properties;
comparing said properties to one or more historical properties; and
determining said properties are above a reputation threshold.

17. The computer program product of claim 15 wherein defining said user profile comprises:
assessing how said user engages with said network, wherein said assessing considers scrolling speed of said user, quantity of interactions of said user with content on said network, and time between said interactions of said user with said content on said network.

18. The computer program product of claim 15 wherein: said properties of said post are included in said corpus.

19. The computer program product of claim 18 further comprising:
receiving feedback from said user; and
integrating said feedback into said corpus.

20. The computer program product of claim 15 further comprising:
analyzing said interactions with said content on said network; and
assessing a reaction of said user based on said interactions.

* * * * *